May 27, 1969   N. GIAMBERTONI   3,446,924
DEVICE FOR CONTROLLING THE WASH CYCLE OF A WASHING MACHINE
Filed July 9, 1968   Sheet 1 of 3

INVENTOR:
NATALE GIAMBERTONI
By
Attorneys

Fig. 3.

WASHING TEMPERS

| | Temperature of pre-washing operation | Temperature of clear-washing operation | Washing cycle | Level of water | Number of rinsing operations | Load stays in water | Intermediate spin operation | Final spin operation or slow spin operation |
|---|---|---|---|---|---|---|---|---|
| 9 | 40° | 90° | N | I | 5 | | ● | With final spin operation |
| 8 | 40° | 90° | S | I | 5 | | ● | With final spin operation |
| 7 | 40° | 90° | N | I | 3 | ● | | Slow spin operation |
| 6 | 40° | 60° | N | I | 5 | | ● | With final spin |
| 5 | 40° | 60° | S | II | 3 | ● | | Slow spin operation |
| 4 | 40° | 40° | N | I | 5 | | ● | With final spin |
| 3 | 40° | 40° | S | II | 3 | ● | | Slow spin operation |
| 2 | 30° | 30° | S | II | 3 | ● | | Slow spin operation |
| 1 | C | C | S | II | 3 | ● | | Slow spin operation |

N = Normal action
S = Gentle action
C = Cold wash

INVENTOR:
NATALE GIAMBERTONI

United States Patent Office 3,446,924
Patented May 27, 1969

3,446,924
DEVICE FOR CONTROLLING THE WASH CYCLE OF A WASHING MACHINE
Natale Giambertoni, Milan, Italy, assignor to Holzer-Patent AG, Zug, Switzerland, a corporation of Switzerland
Continuation-in-part of application Ser. No. 581,546, Sept. 23, 1966. This application July 9, 1968, Ser. No. 743,389
Int. Cl. H01h 7/08, 43/10
U.S. Cl. 200—38    6 Claims

ABSTRACT OF THE DISCLOSURE

A device for controlling the wash cycle of a washing machine. A plurality of primary selector switches are provided for variably setting the time of operation of sequentially performed operations of an automatic washing machine. A secondary selector switch is provided for setting a plurality of preselected combinations of parameters such as water temperature, water level, etc. of the machine operations.

---

This application is a continuation-in-part of my copending application Ser. No. 581,546, filed Sept. 23, 1966, and now abandoned.

This invention relates to a device for the setting of a plurality of washing programs of an automatic washing machine having a timer and a program cycle switch, wherein the various operations and parameters, such as duration of the wash cycles, the temperature of the detergent water, the duration of the spinning cycles, etc., can be discretionally combined to any desired washing program.

The object of the invention is the provision of a device for the variable setting of such a control device as simply as possible with the set operations being clearly and easily readable on an indicator means and being variable as desired.

There have been a number of drawbacks in hitherto known for the control of control mechanisms for the automatic execution of washing machine programs. For example, French Patent 800,876 describes a control device containing a control bar sensed by means of sensor levers. The proper operation of such control device is very difficult for the user and requires very great attention and also a certain degree of technical knowledge, because the setting of the respective controls setting the program can only be read with difficulty.

Drawbacks are inherent also in control devices operated by push buttons, like those described, for example, in the German application 1,162,912 laid open for public inspection. Since push buttons can provide only two switch positions, it is necessary to provide individual push buttons for each program variant, necessitating the provision in such a device of a great number of program variants thereby making the device too large and too expensive to be practicable. In addition, such a device would be too difficult to operate. The programs selectable by push buttons are therefore limited to a few variants. It is true that devices for making program changes, like those described for instance in the French Patent 1,257,295, offer several possibilities in that interchangeable code-plates are provided with an arrangement of holes or notches differing according to the desired program. However, even with these devices it is not possible to adapt the wash programs to individual needs and requirements, because each plate contains a fixed, unalterable wash program. The selection of the suitable plate containing the desired wash program also entails substantial difficulties for an unskilled user.

In addition, these program plates are subject to being damaged as a result of external influences, e.g. soiling and wear, thereby restricting their life and efficiency.

It is therefore the object of the invention to obviate the drawbacks inherent in known devices and to provide a device for the setting of a plurality of wash programs at a control device for automatic washing machines having a timer and a program cycle switch which is simple in design, economic in manufacture, and permits the adapting of the wash program to any individual requirement by means of a simple and readily perceived setting of control elements. Such timers and program cycle switches are described for instance in the U.S. Patents 3,171,987 and 3,046,421.

According to the invention, there are provided a plurality of manually adjustable selector switches that are independent of one another, each selector switch being adapted to assume a number of individual switching positions characterized by reference code numbers. A first plurality of primary selector switches is provided each one of which is adjustable, independently of the other selector switches, in response to a certain time signal by a timer, i.e., the switch responds to a certain timing interrupter of the timer, with a given operation period being assigned to each time signal. Each of these primary selector switches is adapted to determine the operation period of a given operation. In addition, there is provided at least one secondary selector switch having a plurality of switching positions, to which reference code digits that can be read by inspection have likewise been assigned. This secondary selector switch actuates one or a plurality of contacts in each switching position, whereby by means of the contacts of a program cycle switch controlled by the time signals preset on the timer and by means of additional sensor switches, e.g. temperature sensors, level sensors, etc., the individual operations, e.g. water supply or drainage, water heating, etc., as well as the operations pertaining to the selected wash program are connected and disconnected.

The device according to this invention readily permits the setting of a wash program to respond to individual desires and requirements, with the setting being achieved in an extremely simple manner and also being readily verifiable through the easy readability of the preset code numbers. Any possible operation and any possible state (wash water level, wash water temperature, etc.), as well as the duration of each operation and state, can thus be set according to the user's discretion. It is also possible to skip or to completely eliminate certain unneeded operations.

With regard to each desired operation it is possible to individually preset the duration of any operation period prior to the beginning of the wash program. However, even during the operation cycle, it is possible to reduce the balance of that period by the actuating of the respective primary selector switch. The settings accoding to the code digits clearly characterize a wash program comprising several operations and possible states, thereby permitting the user readily to preset a wash program in accordance with his desires and requirements or even to modify it while the program cycle is still in progress. It is understood that, in lieu of the number code, one may use also an alphabetic code or a combination of letters and digits.

An important characteristic of the invention resides in the fact that at least one secondary selector switch has been provided whose switching positions and code digits have been assigned to several operations at each switch position, with the duration of the operations set by this secondary switch being controlled by one of the primary selector switches.

Accordingly, it is possible simultaneously to define by means of this secondary selector switch a certain number of preferred or customarily used operations which, on the basis of experience, occur most frequently. This makes it possible in a reliable and simple manner to prevent improper operations which cannot be accomplished in known control devices without special precautionary measures.

The invention provides that, for the setting and altering of the operation time of the main operations, such as, e.g., pre-washing, washing, rinsing, stoppage, spinning, etc., respective primary selector switches are provided, and by means of a secondary selector switch it is possible to set all operations and the balance of the adjustable parameters, such as temperature, wash water level, etc.

Furthermore, it is preferable that each of the primary and secondary selector switches be provided with an indicator means, e.g., in the form of a stationary or rotatable digit dial and that the digit set in each case be readable over a marker or in a window cut-out in a non-transparent dial while the balance of the digits of the indicator means are covered. The dial with the window cut-out or the marker, or the digit-bearing dial can be connected with the actuating means, e.g., a control knob. Where there is provided a cut-out window cover over a rotary digit dial, actuation of the respective control knob causes each setting of the selector switch to display in the window cut-out the code digit corresponding to the setting of the selector switch in question. Preferably, the digit dial is coupled with the control knob shaft while the cut-out window cover is rigidly arranged. It is, however, also possible to rigidly mount the digit dial and to couple the cut-out window cover with the shaft of the control knob thereby to rotate said cover with the knob.

In a preferred embodiment, the rigid arrangement of the cut-out window cover and the coupling of the digit dial of the selector switch with the shaft of its control knob permits arrangement of the various windows assigned to the respective selector switches along one line so that the digits appearing in these windows constitute, if taken as a whole, a decimal number that is readily recordable in tables as operating instructions and easily retained as a mental image.

Another important feature of the invention resides in the fact that the digit dials of one or a plurality of the primary selector switches may also include the code digit "0," the setting of which in the window of the respective primary selector switch, suppresses the operation or operations set at that moment at the secondary selector switch.

It is thereby possible to inactivate certain operations, e.g., pre-washing or a spinning cycle, even if they have been set at the secondary selector switch. It is of course also possible to provide all primary selector switches with the code digit "0" and to leave it up to user's discretion to execute or suppress the operations assigned to the individual primary selector switches.

A preferred exemplified embodiment of the device in accordance with the present invention is explained in detail below with reference to the drawings in which:

FIG. 3 is a table showing the assigning of a plurality of operation combinations and parameters to the code digits of the secondary selector switch.

Figure 1:
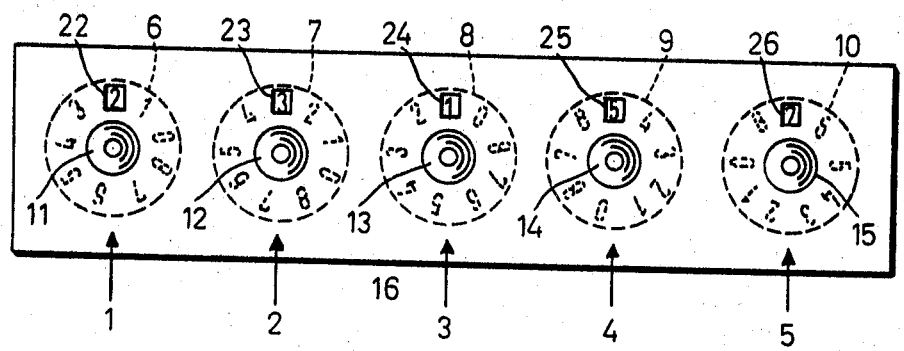
FIG. 1 is a preferred embodiment of the present invention provided with an arrangement of 4 primary selector switches and one secondary selector switch.

FIG. 1 shows the arrangement of four primary selector switches 1, 2, 3, and 4 and one secondary selector switch 5 in one common cover 16. The selector switches 1 to 5 are each provided with a control knob 11, 12, 13, 14, and 15 and are respectively fixedly connected to shafts (not shown). Under the cover 16 there are digit dials 6, 7, 8, 9, and 10 likewise fixedly connected with the shafts of the control knobs 11 to 15. The digit dials 6, 7, 8, and 9 are circular and bear the code digits "0 to 8" whereas the digit dial 10, likewise designed in circular shape, bears the code digits "1" to 9." On the top of the control buttons 11 to 15 there are provided, respectively, windows 22, 23, 24, 25, and 26, in the cover 16, through which the code digits "2," "3," "1," "5," "7" illustrated in the exemplified embodiment can be seen. By rotation of the individual control buttons 11 to 15, the code digits arranged on their digit dials 6 to 10 can be placed into the respective windows 22 to 26.

Whereas a definite time signal, corresponding to a definite operating period, is assigned to each code digit of the digit dials 6 to 9 of the primary selector switches 1 to 4, the code digits of the digit dial 10 of the secondary selector switch 5 characterize, as can be gathered from FIG. 3, different states, e.g., temperatures of the wash water as well as machine operations, e.g., wash cycle, number of spinning cycles, rinsing, etc. The functions of the four primary selector switches therefore reside in sequentially controlling the operations set at the secondary selector switch, i.e., in determining whether and how long the operations set at the secondary selector switch 5 are to run.

A definite operation is preferably assigned to each one of the primary selector switches 1, 2, 3, and 4 in such a way that for example the primary selector switch 1 determines the duration of the pre-wash, the primary selector switch 2 the duration of the wash cycle, the primary selector switch 3 the duration of the rinsing cycle, and the primary selector switch 4 the duration of the spinning cycle.

Figure 2:
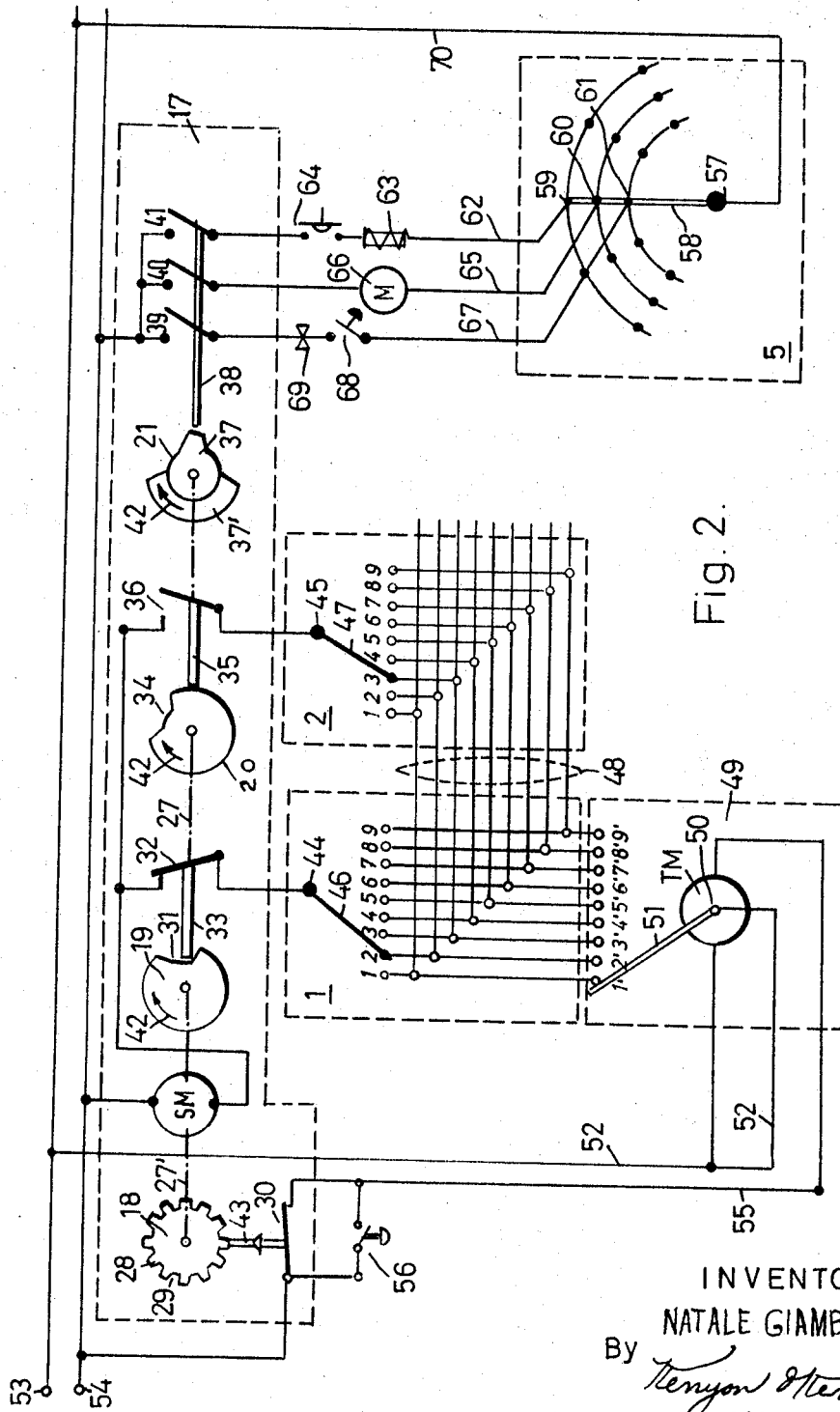
FIG. 2 is a schematic circuit diagram showing the electric circuit connections between two primary and one secondary selector switch.

The construction details of the circuit arrangement of these primary selector switches 1 to 2 and of the secondary selector switch 5 are schematically illustrated in FIG. 2. The parts shown in the dash-line framed field 17 represent a program cycle switch. The program cycle switch is provided with a cycle motor SM actuating the cam disks 18, 19, 20, and 21. All the cam disks 19–21 are mounted jointly on the drive shaft 27 of the program cycle motor SM and are provided with different cam configurations. The cam disk 18 is provided with twelve trigger cams 28 and twelve notches 29 arranged therebetween by means of which it alternatingly briefly opens and closes a switch 30, and is fitted on a shaft 27' driven by a gear (not shown). The cam disk 19 is of substantially circular shape and provided with a notch 31. This cam disk controls a normal contact 32 by means of a feeler pin 33. The cam disk 20 is likewise provided with a notch 34 displaces by a certain angle of approximately 30° with respect to the notch 31 of the cam disk 19. This cam disk 20 controls a normal contact 36 by means of a feeler pin 35.

The cam disk 21 is provided with two trigger cams 37 and 37' simultaneously controlling three switch contacts 39, 40, and 41 by means of a feeler pin 38.

The program cycle motor SM is preferably provided additionally with another reduction gear so that the drive shaft 27 is actuated likewise geared down through at a higher speed than the shaft 27'. It is thus also possible to actuate the drive shaft 27 in such switching steps that, e.g. in accordance with the number of the trigger cams of the cam disk 18, twelve switching steps are executed during a washing program. The respective direction of rotation is shown by means of arrows 42.

With each switching step of the cycle motor SM, the cam disk 18 is advanced in the direction of the arrow 42 by the angle spacing of two adjoining trigger cams 28 thereby briefly opening and then closing again the switch 30 the moment the feeler pin 43 enters the notch 29 situated therebetween. In the dashed-line fields 1 and 2 of FIG. 2, the switching elements of primary selector switches 1 and 2 have been symbolically illustrated. Each one of these primary selector switches is provided with nine contacts marked by the code digits "0 to 8" and can be actuated by a sliding wiper 46 or 47 adjustable by the shaft 44 or 45 of the rotary knobs 11 or 12, which can be set with respect to the individual contacts "1 to 9."

The sliding wipers 46 and 47 are series connected with the normal contacts 32 and 36, respectively, which are controlled by the cam disks 19 and 20, respectively. The individual contacts "1 to 9" of the two primary selector switches 1 and 2 and of the remaining selector switches 3 and 4 are individually interconnected by means of lines 48 and are individually connected to corresponding cotacts 1', 2', 3', 4', 5', 6', 7', 8', 9' of a timer 49. The timer 49 is provided with a drive TM the shaft 50 of which is actuated at constant speed by means of a gear (not shown) when the motor TM is connected. A sliding wiper 51 is mounted on the shaft 50, which sequentially touches the contacts 1 to 9' thereby electrically connecting the line 52 with the pole 53 of a power source. The winding of the motor TM is connected, on the one hand, over the line 52 and, on the other, over the line 55 via the switch 30 with the poles 53 and 54 of the current source. Parallel to the switch 30 there is arranged a manually operable switch 56 for the purpose of selective connection of the timer motor TM when the switch 30 is open.

The mode of operation of the parts described above of FIG. 2 is as follows:

Assuming that the first selector switch 1 has been set to the digit "2," as illustrated in FIGS. 1 and 2, and the selector switch 2 to the dgit "3" so that the sliding wiper 46 rests on the contact "2" and the sliding wiper 47 on the contact "3." In the motor TM of the timer is connected or actuated with the switch 30 being closed or else by actuating of the switch 56, the sliding wiper 51 turns in clockwise direction out of its rest position illustrated in FIG. 2 thus touching first the contact 1' and then the contact 2'. As soon as the sliding wiper 51 touches the contact 2', the motor SM of the program cycle switch 17 is energized and actuated over the following circuit: terminal 53, line 52, sliding wiper 51, contact 2', contact "2," sliding wiper 46, normal contact 32, motor SM and the terminal 54. In the process, the shaft 27 is turned by such an angle that the cam disk 19 opens the normal contact 32 and that the cam disk 20 closes the normal contact 36, whereby the feeler pin 33 is lifted onto the circumference of the cam disk 19 and the feeler pin 35 falls into the notch 34 of the cam disk 20. During this angular movement of the shaft 27, the shaft 27' executes an angular movement of 30° so that the feeler pin 43 of the switch 30 passes from one trigger cam 28 over the subsequent notch 29 to the subsequent trigger cam 28 thereby opening and closing the switch 30 for a brief interval.

Through the opening of the normal contact 32, the motor SM of the program cycle switch 17 is disconnected and through the opening of the switch 30, which occurred meanwhile, the motor TM of the timer is also disconnected for a brief interval. It is to be mentioned also that the sliding wiper 51 is returned into its initial position illustrated in FIG. 2 by means of a per se known resetting device (not shown; see for instance U.S. Patent Nos. 3,171,987 and 3,046,421) while the timer motor TM is disconnected. In view of the fact that, following this switching step, the sliding wiper 46 of the selector switch 1 is, as a result of the opening of the normal contact 32, no longer connected with the terminal 54 of the current source, the selector switch 1 can not become operable during the subsequent program phase. In turn, however, the normal contact 36 has now been closed thus actuating selector switch 2.

As soon as the switch 30 has again been closed, the timer motor TM is reactuated and the sliding wiper 51 runs again in clockwise direction. As soon as the sliding wiper 51 has reached the contact 3' in this program phase, the process described above is repeated and, thereupon, the next selector switch 3 is actuated by the closing of a normal contact (not shown) which corresponds to the contacts 32 and 36.

As mentioned above, constant speed motor TM rotates shaft 50 on which the sliding wiper 51 has been affixed at constant speed so that wiper 51 requires a defined time interval to rotate from its rest position to one of the contacts 1' to 9' set by one of the selector switches 1 to 4. Therefore, selector switches 1 to 4, respectively by means of the position of their wipers 46, 47, etc., determine exactly the defined time intervals during which the desired operations of the selected wash program take place.

As can furthermore be seen from FIG. 2, secondary selector switch 5 is also provided on the shaft 57 of its knob 15 with a wiper 58. However, to this wiper there have been assigned, not merely a single contact for each switch position as in the case of the primary selector switches 1 to 4, but, in each case, a contact combination that may comprise for instance three contacts 59, 60 and 61.

Contact 59 is connected by means of a line 62 with a heating coil 63 and, over a temperature sensor actuated contact 64, with the switch 41.

Contact 60 is connected over a line 65 over the winding of a motor 66, which could be either the spinning motor or the wash cycle motor of the washing machine, the other winding terminal of which has been connected with the switch 40.

Contact 61 is connected over a line 67 and a switch 68 actuated for instance by a water level sensor, over an electromagnetically actuated water inlet valve 69 with the switch 39.

In the angular position of the cam disk 21 illustrated in FIG. 2, switches 39, 40 and 41 are held in the open position by cam 37 and feeler pin 38. When, during the first switching step of the motor SM of the program cycle switch 17, cam disk 21 turns by the angle of rotation of the shaft 27, control pin 38 slides from the cam 37 onto the smaller diameter of the cam disk 21, thereby closing the switches 39, 40, and 41. As a result, first, the circuit of the motor 66 is closed in view of the fact that the fixed contacts of the switches 39, 40 and 41 are connected with the terminal 54 of the current source and the sliding wiper 58 over a line 70 with the other terminal 53 of the current source. The motor 66 is energized and starts executing either the spinning or the washing cycle. Let us assume that the switch 68, on account of an insufficient amount of water in the washing drum, is closed, the water inlet valve 69 is also opened simultaneously with the starting of the motor 66. In that case, the water inlet valve 69 is closed following reopening of the switch 68 by the water level sensor. This process is to be characterized as an independent excitation because the switch 68 is not be actuated directly by the operator.

Contrary to the representation illustrated in FIG. 2, it is also to be assumed that the water or the detergent containing water has not yet reached the required temperature level and that the switch 64 would be closed. In the case of switch 64 being closed, the heating coil 63 is also actuated simultaneously with the motor 66. The opening of the switch 64 is achieved by a correspondingly preset temperature sensor after the desired water temperature has been achieved so that this process is likewise subject to the independent energization rather than to control by the operator.

It ought to be pointed out also that the cam disk 21 has, for simplicity's sake, been illustrated as representative for a number of cam disks of this type in FIG. 2 and that said additional cam disks that have not been illustrated can actuate the switches 39, 40 and 41 individually or else in other combinations. It need probably not be particularly emphasized that, in accord with the representative illustration of the switches 39, 40 and 41, other switches are also present which are combined with the other contact combinations of the selector switch 5.

As soon as the second switching step of the program cycle motor SM has been initiated through the action of wiper 51 of timer 49 reaching contact 3', the cam disk 21 rotates together with the cam disks 19 and 20 by such an angle that the feeler pin 38 is again lifted onto the larger diameter of the second cam 37' of the cam disk 21 thereby reopening the switches 39, 40 and 41. Simultaneously, another contact switch combination (not shown) corresponding in whole or in part to that of the switches 39, 40 and 41, is closed so that, during the next program cycle, for example only the wash motor 66 is activated and a switch controlling its rotary cycle is closed. This last-mentioned switch must obviously be connected also with the wiper 58 in the position illustrated in FIG. 2, i.e., that the wiper 58 closes not only the three contacts 59, 60 and 61 but also this very switch controlling the rotary cycle of the motor 66. It is thus seen that the various combinations of parameters which are possible are virtually limitless.

In FIG. 3, the following operations are assigned by way of example to the code digit "4" of the secondary selector switch 5:

Heating of the water temperature to 40° C.

The washing cycle is performed in its standard cycle. The water level reaches the level I. There occur five rinsing cycles. Following rinsing, the water is removed from the washing machine by suction. There then occurs an intermediate spinning operation. At the end of the program, the wash is dry-spun (final spinning operation).

The duration of the standard wash cycle is chronologically controlled with regard to these phases so that, for instance, the selector switch 1 is disconnected after 60 seconds upon reaching of the contact 2', by the wiper 51 of the timer 49.

The selector switch 2, to which for instance the "rinsing" operation has been assigned serves in this case to determine the duration of each one of the five rinsing cycles mentioned in the table of FIG. 3. This means that, in this case, the normal contact 36 is opened only after five switching steps of the program cycle switch 17 so that the wiper 51 of the timer 49 covers five times the distance from rest position to contact 3' thereby requiring in each case an interval of 80 seconds. As a result, each one of the five rinsing cycles would take 80 seconds.

Similarly, the selector switch 3 can for instance be assigned to the "intermediate spin operation" and the selector switch 4 to the "dry-spin operation" (final spin operation).

What is claimed is:

1. A program control system for a machine comprising program cycle switch means, primary selector switch means connected to said program cycle switch means, said primary selector switch means being manually adjustable so that it may be set to pre-selected durations of operation of sequentially performed operations of said machine, timer means connected to said program cycle switch means and said primary selector switch means, parameter control means connected to said program cycle switch means, secondary selector switch means connected to said parameter control means, said secondary selector switch means being manually adjustable so that it may be set to one of a plurality of pre-selected programs of parameters and operations for said machine, so as to condition said parameter control means to control the parameters for each operation of said machine according to said pre-selected program, said program cycle switch means being adapted to initiate operation of said timer, said timer being operatively connected to said program cycle switch means through said primary selector switch means in accordance with said durations of time set into said primary selector switch means, thereby causing said program cycle switch means to sequentially actuate said parameter control means to control the parameters for each sequentially controlled operation according to said pre-selected program set by said secondary selector switch means and according to the durations of time set by said primary selector switch means.

2. The program control system of claim 1 wherein said primary selector switch means comprises a plurality of manually settable primary selector switches, each of said primary selector switches controlling the duration of operation of separate operations of said machine and being adjustable to a number of switch positions wherein each position represents a predetermined duration of time, said timer being operatively connected to said program cycle switch means sequentially through said plurality of primary selector switches.

3. The program control system of claim 2 wherein said secondary selector switch means comprises a secondary selector switch adjustable to a number of switch positions wherein each position represents a pre-selected program of parameters and operations of said machine.

4. The program control system of claim 3 wherein said primary and said secondary selector switches are respectively provided with a control knob, and a code digit bearing dial having a plurality of digits each of which represents a switch position, a cover plate on said machine, said knobs and said dials being affixed to each other and rotatably mounted in said cover plate, said cover plate having windows between the knobs and dials so that individual digits may be read therethrough.

5. A program control system for a machine comprising at least one primary selector switch manually adjustable to one of a plurality of contact positions, each of said positions representing a different time interval of operation of said machine, a timer having a plurality of contacts each of which is electrically connected to one of said contact positions of said selector switch, a source of electrical energy, a first interruptible switch connected between said source of electrical energy and said timer, interrupter means, a second interruptible switch, said interrupter means and said second interruptible switch being connected in series between said source of electrical energy and said primary selector switch, said interrupter means being connected to said first and second interruptible switches, whereby when said first selector switch is closed, said second interruptible switch is also closed and said timer is activated to scan said plurality of timer contacts such that when the timer contact is scanned corresponding to the contact position set on said primary selector switch, said interrupter means is actuated to interrupt said first and second interruptible switches thereby deactivating said timer and allowing it to return to its initial position and causing the operation of said machine to be terminated.

6. The control system of claim 5 including a secondary selector switch manually adjustable to one of a plurality of contact positions, each of said positions representing a pre-selected program of parameters and operations of said machine, a plurality of further interruptible switches electrically connected between said source of electrical energy and said second selector means, said interrupter means being connected to said further interruptible switches, whereby said interrupter means causes said further interruptible switches to be closed during the interval of activation of said timer, but open prior to and after said interval.

References Cited

UNITED STATES PATENTS

| | | | |
|---|---|---|---|
| 2,414,191 | 1/1947 | Coon | 200—167 |
| 3,132,216 | 5/1964 | Adams | 200—167 |
| 3,205,651 | 9/1965 | Stiffler. | |
| 3,227,847 | 1/1966 | Blodgett | 200—167 |

ROBERT K. SCHAEFER, *Primary Examiner.*

H. O. JONES, *Assistant Examiner.*

U.S. Cl. X.R.

200—167